(12) United States Patent
Fukawatase et al.

(10) Patent No.: US 9,108,588 B2
(45) Date of Patent: Aug. 18, 2015

(54) CURTAIN AIRBAG DEVICE AND OCCUPANT PROTECTING DEVICE

(71) Applicant: Toyota Jidosha Kabushiki Kaisha, Toyota-shi Aichi-ken (JP)

(72) Inventors: Osamu Fukawatase, Miyoshi (JP); Hiroyuki Taguchi, Toyota (JP)

(73) Assignee: Toyota Jidosha Kabushiki Kiasha, Toyota-shi (JP)

( * ) Notice: Subject to any disclaimer, the term of this patent is extended or adjusted under 35 U.S.C. 154(b) by 0 days.

(21) Appl. No.: 14/138,285

(22) Filed: Dec. 23, 2013

(65) Prior Publication Data

US 2014/0217710 A1 Aug. 7, 2014

(30) Foreign Application Priority Data

Feb. 7, 2013 (JP) .................................. 2013-022170

(51) Int. Cl.
*B60R 21/233* (2006.01)
*B60R 21/232* (2011.01)
*B60R 21/00* (2006.01)
*B60R 21/231* (2011.01)
*B60R 21/2338* (2011.01)

(52) U.S. Cl.
CPC ............. *B60R 21/233* (2013.01); *B60R 21/232* (2013.01); *B60R 2021/0006* (2013.01); *B60R 2021/23107* (2013.01); *B60R 2021/23308* (2013.01); *B60R 2021/23386* (2013.01)

(58) Field of Classification Search
USPC ...................................................... 280/730.2
See application file for complete search history.

(56) References Cited

U.S. PATENT DOCUMENTS

| | | | | |
|---|---|---|---|---|
| 6,428,037 B1 * | 8/2002 | Bakhsh et al. | ................ | 280/729 |
| 6,695,341 B2 * | 2/2004 | Winarto et al. | ............ | 280/730.2 |
| 6,695,347 B2 * | 2/2004 | Sonnenberg et al. | ...... | 280/743.2 |
| 7,513,523 B2 * | 4/2009 | Bayley et al. | ............. | 280/730.2 |
| 7,618,057 B2 * | 11/2009 | Pinsenschaum et al. | .. | 280/730.2 |
| 7,841,621 B2 * | 11/2010 | Dix | ............ | 280/730.2 |
| 7,942,444 B2 * | 5/2011 | Steinbach et al. | ......... | 280/743.2 |
| 8,282,124 B2 * | 10/2012 | Trovato et al. | ............ | 280/730.2 |
| 8,684,408 B2 * | 4/2014 | Thomas et al. | ............ | 280/743.2 |
| 8,789,846 B2 * | 7/2014 | Wipasuramonton et al. | ......................... | 280/730.2 |
| 2003/0098573 A1 * | 5/2003 | Sonnenberg et al. | ...... | 280/743.2 |
| 2003/0230877 A1 * | 12/2003 | Kim et al. | .................. | 280/730.2 |

(Continued)

FOREIGN PATENT DOCUMENTS

| JP | 2006-088919 A | 4/2006 |
|---|---|---|
| JP | 2008-006895 A | 1/2008 |

(Continued)

*Primary Examiner* — Nicole Verley
(74) *Attorney, Agent, or Firm* — Gifford, Krass, Sprinkle, Anderson & Citkowski, P.C.

(57) ABSTRACT

A curtain airbag device comprising: a main deploying portion that, at a time when at least one of a small overlap impact or an oblique impact arises, receives a supply of gas and expands, and is deployed in a shape of a curtain; an auxiliary deploying portion that is provided at a front side of the main deploying portion, and that, at a time when at least one of a small overlap impact or an oblique impact arises, receives a supply of gas and is expanded and deployed; and a connecting portion that has an expanding portion that receives a supply of gas from the main deploying portion and is expanded at an outer side in a vehicle width direction of the auxiliary deploying portion, and the connecting portion connects a front end side portion of a front pillar, and a front end side portion of the main deploying portion.

20 Claims, 4 Drawing Sheets

(56) References Cited

U.S. PATENT DOCUMENTS

| | | | |
|---|---|---|---|
| 2006/0097492 A1* | 5/2006 | Bakhsh et al. | 280/730.2 |
| 2008/0012275 A1* | 1/2008 | Pinsenschaum et al. | 280/730.2 |
| 2008/0079246 A1* | 4/2008 | Dix | 280/730.2 |
| 2009/0102169 A1 | 4/2009 | Gloeckler et al. | |
| 2010/0025971 A1* | 2/2010 | Steinbach et al. | 280/729 |
| 2010/0225097 A1* | 9/2010 | Trovato et al. | 280/730.2 |
| 2011/0012328 A1* | 1/2011 | Ewing et al. | 280/730.2 |
| 2011/0285115 A1* | 11/2011 | Putala et al. | 280/730.2 |
| 2013/0234422 A1* | 9/2013 | Wipasuramonton et al. | 280/730.2 |
| 2014/0125040 A1* | 5/2014 | Fink | 280/730.2 |
| 2014/0217709 A1* | 8/2014 | Fukawatase et al. | 280/730.2 |
| 2014/0239619 A1* | 8/2014 | Fukawatase et al. | 280/730.2 |
| 2014/0265268 A1* | 9/2014 | Wang et al. | 280/729 |
| 2014/0265270 A1* | 9/2014 | Wang | 280/730.2 |

FOREIGN PATENT DOCUMENTS

| | | |
|---|---|---|
| JP | 2009-531216 A | 9/2009 |
| JP | 2012-020719 A | 2/2012 |

* cited by examiner

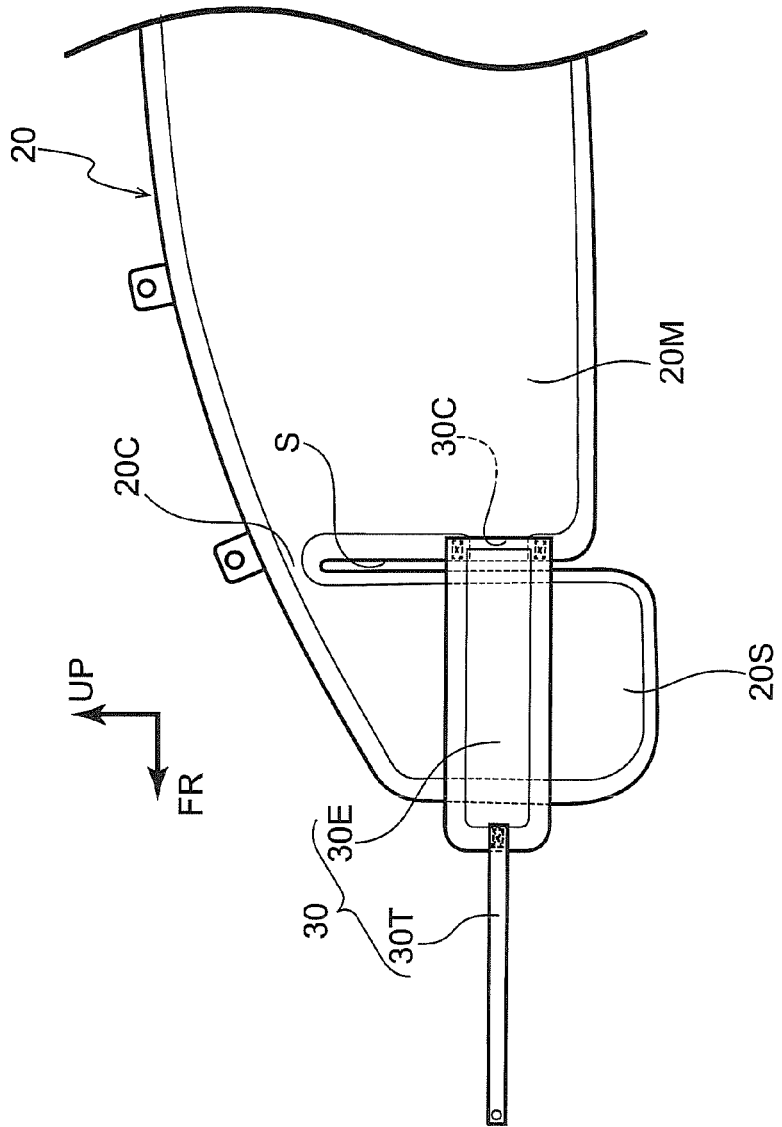

CURTAIN AIRBAG DEVICE AND OCCUPANT PROTECTING DEVICE

CROSS-REFERENCE TO RELATED APPLICATION

This application claims priority under 35 USC 119 from Japanese Patent Application No. 2013-022170, the disclosure of which is incorporated by reference herein.

BACKGROUND OF THE INVENTION

1. Field of the Invention

The present invention relates to a curtain airbag device and to an occupant protecting device that has the curtain airbag device.

2. Description of Related Art

In a curtain airbag, there is known a structure in which an end portion inflating portion, that is deployed at the front of a general inflating portion, is moved toward the vehicle inner side by a tension cloth that is deployed between the front end of the general inflating portion and the front pillar (see, for example, Japanese Patent Application Laid-Open (JP-A) No. 2008-006895). Further, a similar structure is disclosed in JP-A No. 2012-020719.

SUMMARY OF THE INVENTION

In a structure in which an end portion inflating portion is moved toward the vehicle inner side by a tension cloth, it is difficult to ensure the amount of movement of the end portion inflating portion toward the vehicle inner side. Therefore, there is room for improvement in a structure that protects an occupant by an end portion inflating portion.

An object of the present invention is to provide a curtain airbag device and an occupant protecting device that can improve the occupant protecting ability by an auxiliary deploying portion that is expanded and deployed at the front of a main deploying portion.

A curtain airbag device relating to a first aspect includes: a main deploying portion that, at a time when a side impact arises, and at a time when at least one of a small overlap impact or an oblique impact arises, receives a supply of gas and expands, and is deployed in a shape of a curtain along a side window glass; an auxiliary deploying portion that is provided at a front side in a vehicle front-rear direction of the main deploying portion, and that, at a time when at least one of a small overlap impact or an oblique impact arises, receives a supply of gas and is expanded and deployed; and a connecting portion that has an expanding portion that receives a supply of gas from the main deploying portion and is expanded at an outer side in a vehicle width direction of the auxiliary deploying portion, and the connecting portion connects a front end side portion in the vehicle front-rear direction of the front pillar, and a front end side portion in the vehicle front-rear direction of the main deploying portion.

BRIEF DESCRIPTION OF DRAWINGS

FIG. 3 is a side view showing a front portion of a curtain airbag that structures the occupant protecting device relating to the embodiment of the present invention, and showing a state of not being expanded and deployed (before being folded-up).

DETAILED DESCRIPTION OF THE INVENTION

Figure 1:
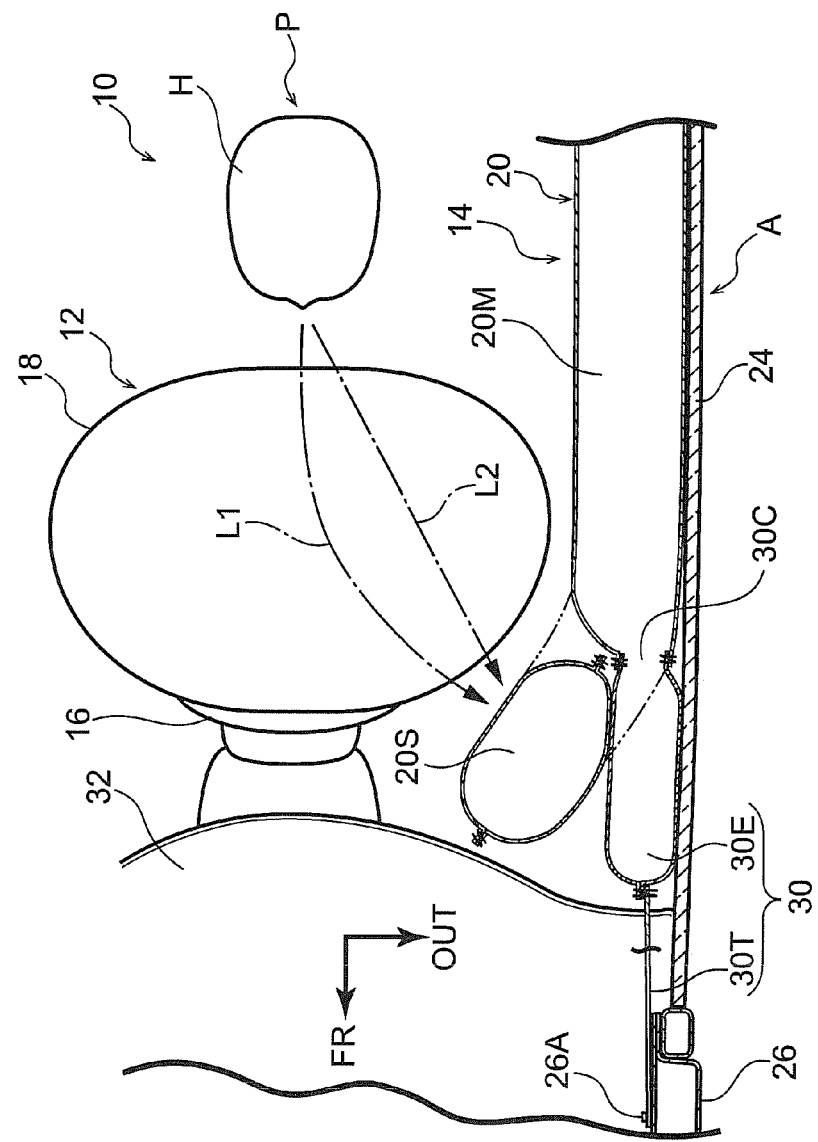
FIG. 1 is a plan view schematically showing an operated state of an occupant protecting device relating to an embodiment of the present invention.
Figure 2:
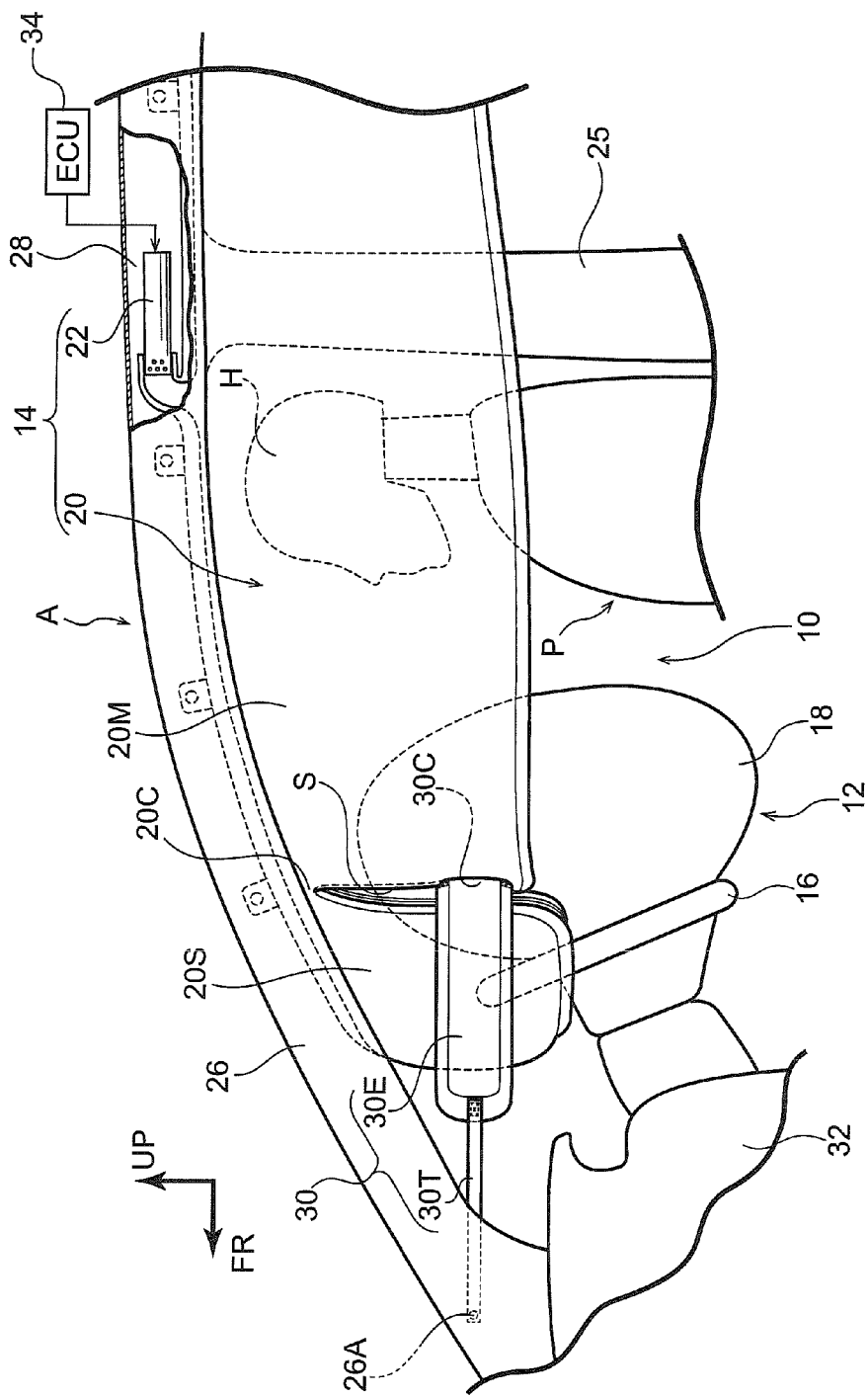
FIG. 2 is a side view that is seen from a vehicle outer side and schematically shows the operated state of the occupant protecting device relating to the embodiment of the present invention.

An occupant protecting device 10 relating to an embodiment of the present invention is described on the basis of FIG. 1 through FIG. 3. Note that arrow FR, arrow UP and arrow OUT, that are shown appropriately in the respectively drawings, indicate the frontward direction, the upward direction and the vehicle width direction outer side, respectively, of an automobile A to which the occupant protecting device 10 is applied. Hereinafter, when description is given by simply using the frontward and rearward, and upward and downward, directions, they indicate frontward and rearward in the vehicle front-rear direction, and the upward and downward in the vehicle up-down direction, unless otherwise indicated.

A portion of a vehicle cabin interior of the automobile A to which the occupant protecting device 10 is applied is shown in a plan view in FIG. 1. A portion of the automobile A is shown in FIG. 2 in a side view seen from a vehicle outer side. As shown in these drawings, the occupant protecting device 10 is structured to include a driver's seat airbag device 12 serving as an airbag device for a front seat, and a curtain airbag device 14.

(Structure of Driver's Seat Airbag Device)

The driver's seat airbag device 12 has an airbag 18 for a frontal impact that is deployed at the rear of a steering wheel 16. The airbag 18 for a frontal impact is accommodated in a folded-up state within the steering wheel 16 together with an unillustrated inflator. Due to the inflator being operated, the airbag 18 for a frontal impact receives a supply of gas from the inflator, and is expanded and deployed between the steering wheel 16 and a driver's seat occupant P.

As described later, the inflator of this driver's seat airbag device 12 is operated at the time of a frontal impact of the automobile A, and at the time of a small overlap impact, and at the time of an oblique impact. Note that the states of impact of a small overlap impact and an oblique impact are described later.

(Structure of Curtain Airbag Device)

As shown in FIG. 2, the curtain airbag device 14 has a curtain airbag 20 and an inflator 22 that serves as a gas supplying device. The curtain airbag 20 is formed so as to deploy in the shape of a curtain along a side window glass 24 (see FIG. 1) that serves as a vehicle cabin inner side portion. In this embodiment, the curtain airbag 20 is structured so as to cover the front and rear side window glasses 24, that are positioned at the sides of the front seat and the rear seat, and a center pillar 25. Note that mainly the front portion of the curtain airbag 20 is illustrated in FIG. 1 and FIG. 2.

Although not illustrated, the curtain airbag 20 is accommodated in a portion that extends from a front pillar (an A pillar) 26 over a roof side portion 28 to a vicinity of a rear pillar, in a state of being, for example, folded into the form of a roll or folded into the form of bellows and made into an elongated shape. The roof side portion 28 in this embodiment forms the upper edges of front and rear door openings that serve as opening portions for ingress and egress. The door openings are formed so as to be surrounded by the roof side portion 28, the front pillar 26, the center pillar 25, and the rear pillar and a rocker that are both unillustrated.

More concretely, the curtain airbag 20 is accommodated between a roof head lining and a roof side rail that forms the roof side portion 28, and between the front pillar 26 and the pillar garnish. Note that a portion of the front end side of the curtain airbag 20 may be folded-up or folded-over toward the vehicle width direction inner side and accommodated in the roof side portion 28 or within the roof front end portion.

Further, due to the inflator 22 being operated, the curtain airbag 20 receives a supply of gas from the inflator 22, and deploys along the front and rear side window glasses 24 and the center pillar 25, and protects the heads of the occupants of the front seat and the rear seat. Concretely, a combustion type or a cold gas type inflator is employed for the inflator 22, and, by being operated, the inflator 22 supplies generated gas to the interior of the curtain airbag 20. The gas jet-out opening of the inflator 22 communicates with the inside of the curtain airbag 20. In this embodiment, the inflator 22 is disposed in the roof side portion 28. Note that the shape of the curtain airbag 20 is described later.

The above-described curtain airbag device 14 is provided at each of the roof side portions 28 and the like at the vehicle width direction both sides of the automobile A. Although illustration and detailed description are omitted, the curtain airbag device 14 for the front occupant's seat side is structured so as to have line symmetry (left-right symmetry) with the curtain airbag device 14 for the driver's seat side, across the vehicle width direction center (central line) of the automobile A. This curtain airbag 14 for the front occupant's seat side, and a front occupant's seat airbag device that serves as an airbag device for a front seat, structure an occupant protecting device.

(Structure of Curtain Airbag Front Portion)

The front portion at the curtain airbag 20 is structured to include a main deploying portion 20M that mainly protects a head H of a driver's seat occupant P with respect to side impacts and roll-overs, and an auxiliary deploying portion 20S that is expanded and deployed at the front of the main deploying portion 20M. Further, the front portion of the curtain airbag 20 is structured to include a connecting portion 30 that connects the front end portion of the main deploying portion 20M and the front end portion of the front pillar 26. Concrete description is given hereinafter.

A deployed state, in a non-restrained state with respect to the vehicle body and a non-expanded state, of the front portion of the curtain airbag 20 is shown in a side view in FIG. 3. As shown in this drawing, the auxiliary deploying portion 20S is made to be a bag (a chamber) that is independent from the main deploying portion 20M. The upper rear end portion of the auxiliary deploying portion 20S is a communicating portion 20C that communicates the auxiliary deploying portion 20S and the main deploying portion 20M.

The auxiliary deploying portion 20S receives a supply of gas from the main deploying portion 20M through the communicating portion 20C, and is expanded and deployed in a tube shape (a substantially cylindrical shape) that is long vertically. In this embodiment, the auxiliary deploying portion 20S is structured so as to be expanded and deployed such that the lower end thereof projects-out further downward than the lower end of the main deploying portion 20M. Further, in this embodiment, the auxiliary deploying portion 20S is structured so as to be expanded and deployed such that the lower end thereof projects-out further downward than an unillustrated door belt line BL. Due thereto, at the time of a roll-over of the automobile A, the occupant being thrown-out of the vehicle is prevented or effectively suppressed.

Note that a slit S, that is long vertically and that separates the main deploying portion 20M and the auxiliary deploying portion 20S, is formed beneath the communicating portion 20C at the curtain airbag 20. The slit S extends to the lower end of the curtain airbag 20. Note that there may be a structure in which a seam (a sewn portion) that runs along the up-down direction is formed instead of the slit S.

The connecting portion 30 is deployed along the front-rear direction, and, as described above, is structured so as to connect the front end portion of the main deploying portion 20M and the front end portion of the front pillar 26. The rear portion of the connecting portion 30 is an expanding portion 30E that is expanded and deployed overlappingly at the vehicle width direction outer side of the auxiliary deploying portion 20S. The front portion of the connecting portion 30 is a tether 30T.

Concretely, the expanding portion 30E is formed in the shape of a bag that forms a cylindrical (a substantially solid cylindrical) deployed shape that is long from front to rear. The rear end of the expanding portion 30E is a communicating portion 30C that is communicated with the portion, that forms the front edge that faces out onto the slit S, of the main deploying portion 20M. In this embodiment, the expanding portion 30E is structured from a base cloth that is separate from the base cloth that structures the main deploying portion 20M and the auxiliary deploying portion 20S, and the expanding portion 30E is connected, in an gastight state, by sewing or the like to the front end portion of the main deploying portion 20M at the periphery of the communicating portion 30C.

Due thereto, the deploying portion 30M receives a supply of gas from the main deploying portion 20M through the communicating portion 30C, and is expanded and deployed in the shape of a cylinder that is long from front to rear as described above. In this embodiment, the front and rear end portions of the expanding portion 30E in the deployed state are structured so as to project-out forward and rearward with respect to the auxiliary deploying portion 20S. Namely, the expanding portion 30E is expanded and deployed overlappingly at the vehicle width direction outer side of the auxiliary deploying portion 20S, over the entire length in the front-rear direction of the auxiliary deploying portion 20S.

The rear end portion of the tether 30T is connected to the front end portion (the closed end portion) of the expanding portion 30E, and the front end portion of the tether 30T is connected to a connection portion 26A that is provided at the front end portion of the front pillar 26. The straight line that connects the connection point of the tether 30T to the connection portion 26A, and a connection point of the unillustrated rear end side of the curtain airbag 20 to a rear pillar, forms a tension line of the curtain airbag 20 in the deployed state. From the deployed state such as shown in FIG. 3, the curtain airbag 20 is folded in the form of a roll or folded in the form of bellows as described above, and is accommodated in the roof side portion 28.

[Summary of Structure of Curtain Airbag]

In the above-described curtain airbag device 14, the auxiliary deploying portion 20S is expanded and deployed so as to cover the front pillar 26 and the vehicle width direction outer end portion of an instrument panel 32 as seen from the driver's seat occupant P. Further, as shown in FIG. 1 and FIG. 2, the auxiliary deploying portion 20S is expanded and deployed at the front side with respect to the airbag 18 for a frontal impact (the steering wheel 16), as seen in plan view and side view.

[Structure of ECU]

Further, the occupant protecting device 10 has an occupant protecting ECU 34 that serves as a control device. The occupant protecting ECU 34 is electrically connected to plural impact sensors that are not illustrated. On the basis of information from the respective impact sensors, this occupant protecting ECU 34 can sense (the occurrence of or that there inevitably will be) a frontal impact, a side impact, a rollover, a small overlap impact or an oblique impact with respect to the automobile A to which the occupant protecting ECU 34 is applied.

Here, a small overlap impact is an impact in which the amount of overlap in the vehicle width direction with the collided-with object, as prescribed by IIHS for example, is less than or equal to 25% of the overall width of the automobile A. For example, an impact with the vehicle width direction outer side of a front side member that is a part of the vehicle body skeleton, corresponds to a small overlap impact. In this embodiment, as an example, a small overlap impact at a relative speed of 64 km/hr is supposed. Further, an oblique impact is an impact from the oblique front of the vehicle as prescribed by NHSTA for example (as an example, an impact in which the relative angle with the collided-with object is 15° and the overlap amount in the vehicle width direction is around 35%). In this embodiment, as an example, an oblique impact of a relative speed of 90 km/hr is supposed.

In a case in which the occupant protecting ECU 34 senses a frontal impact, the occupant protecting ECU 34 causes the inflator of the driver's seat airbag device 12 to operate. Further, in a case in which the occupant protecting ECU 34 senses a side impact or a roll-over, the occupant protecting ECU 34 causes the inflator 22 of the curtain airbag device 14 to operate. Moreover, in a case in which the occupant protecting ECU 34 senses a small overlap impact or an oblique impact, the occupant protecting ECU 34 causes the inflator of the driver's seat airbag device 12 and the inflator 22 of the curtain airbag device 14, respectively, to operate.

(Operation)

Operation of the present embodiment is described next.

First, operation of the occupant protecting device 10 in a case in which the occupant protecting ECU 34 senses a small overlap impact is described.

When, on the basis of signals from the respective impact sensors, the occupant protecting ECU 34 senses that a small overlap impact has occurred, the occupant protecting ECU 34 causes the inflator of the driver's seat airbag device 12 and the inflator 22 of the curtain airbag device 14 to operate. Thus, the airbag 18 for a frontal impact receives a supply of gas from the inflator, and is expanded and deployed at the front of the driver's seat occupant P and at the upper rear side of the steering wheel 16.

Further, the curtain airbag 20 receives a supply of gas from the inflator 22, and the main deploying portion 20M is deployed in the shape of a curtain along the side window glasses 24. Moreover, the auxiliary deploying portion 20S, and the expanding portion 30E of the connecting portion 30, that receive a supply of the gas from the inflator 22 through the main deploying portion 20M and the communicating portion 30C, are expanded and deployed.

At the time of a small overlap impact, the driver's seat occupant P moves forward with respect to the vehicle body, and moreover, also moves outwardly in the vehicle width direction (refer to arrow L1 shown by the imaginary line in FIG. 1). Therefore, there are cases in which the head H of the driver's seat occupant P enters-in between the airbag 18 for a frontal impact and the main deploying portion 20M of the curtain airbag 20.

Here, in the present occupant protecting device 10, the expanding portion 30E is expanded and deployed overlappingly at the vehicle width direction outer side of the auxiliary deploying portion 20S. At this time, the auxiliary deploying portion 20S is greatly protruded-out and deployed toward the vehicle width direction inner side due to the expanding portion 30E, that is expanded and deployed overlappingly at the vehicle width direction outer side of the auxiliary deploying portion 20S, being interposed between the auxiliary deploying portion 20S and the side window glass 24. Due thereto, the auxiliary deploying portion 20S is greatly moved (greatly protruded-out) inwardly in the vehicle width direction, as compared with a comparative example in which, for example, an end portion deploying portion is moved toward the vehicle width direction inner side by a tension cloth that is deployed due to tension being applied thereto between the main deploying portion 20M and the front pillar 26.

Due thereto, even if the head H of the driver's seat occupant P were to slip through between the airbag 18 for a frontal impact and the main deploying portion 20M, the head H contacting the front pillar 26 or the instrument panel 32 or the like would be prevented or effectively suppressed by the auxiliary deploying portion 20S. At this time, at the auxiliary deploying portion 20S, the reaction force is supported at the lower end portion thereof that is positioned further downward than the door belt line BL. Therefore, the occupant restraining ability is good as compared with a structure that does not have a portion that is positioned further downward than the door belt line BL. Further, due to the vehicle width direction outer end portion of the airbag 18 for a frontal impact, that limits forward movement of the head H, interfering with the auxiliary deploying portion 20S, the effect of effectively suppressing the head H slipping through between the airbag 18 for a frontal impact and the main deploying portion 20M also can be anticipated.

Operation of the occupant protecting device 10, in a case in which the occupant protecting ECU 34 senses an oblique impact, is described next.

When, on the basis of signals from the respective impact sensors, the occupant protecting ECU 34 senses that an oblique impact has occurred, the occupant protecting ECU 34 causes the inflator of the driver's seat airbag device 12 and the inflator 22 of the curtain airbag device 14 to operate. In an oblique impact, the driver's seat occupant P moves rectilinearly forward and toward the vehicle width direction outer side (refer to arrow L2 shown by the imaginary line in FIG. 1). Even in this case, the auxiliary deploying portion 20S is moved greatly toward the inner side in the vehicle width direction as described above, and therefore, the head H contacting the front pillar 26 or the instrument panel 32 or the like is prevented or effectively suppressed by the auxiliary deploying portion 20S. At this time, at the auxiliary deploying portion 20S, the reaction force is supported at the lower end portion thereof that is positioned further downward than the door belt line BL. Therefore, the occupant restraining ability is good as compared with a structure that does not have a portion that is positioned further downward than the door belt line BL. Moreover, due to the vehicle width direction outer end portion of the airbag 18 for a frontal impact, that limits forward movement of the head H, interfering with the auxiliary deploying portion 20S, the effect of effectively suppressing the head H slipping through between the airbag 18 for a frontal impact and the main deploying portion 20M also can be anticipated.

Further, at the curtain airbag device 14, there is a structure in which the expanding portion 30E is expanded and deployed overlappingly at the vehicle width direction outer side of the auxiliary deploying portion 20S, due to the expanding portion 30E being provided at the connecting portion 30 that connects the main deploying portion 20M and the front pillar 26. Namely, the auxiliary deploying portion 20S can be moved greatly toward the vehicle width direction inner side by a simple structure.

(Converted Example)

Figure 4A:
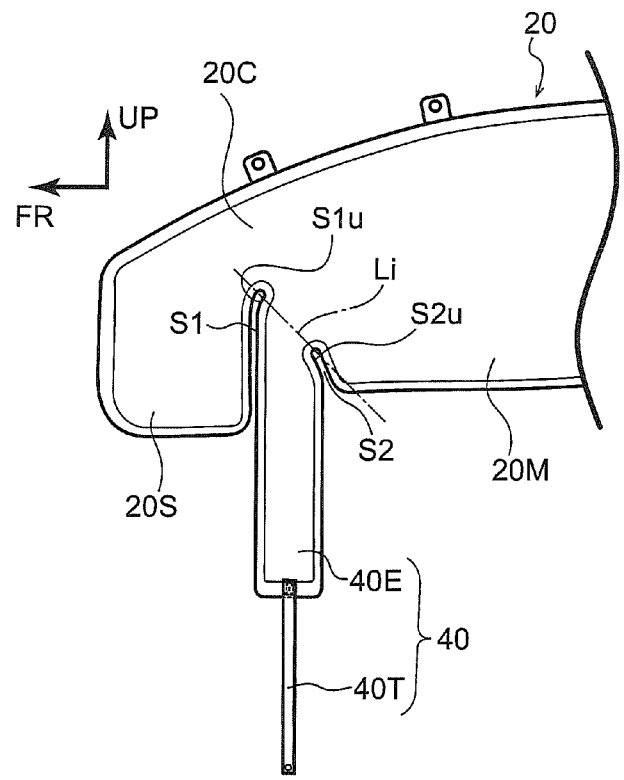
FIG. 4A is a side view showing a converted example of the curtain airbag that structures the occupant protecting device relating to the embodiment of the present invention, and showing a state in which the curtain airbag is not expanded and deployed.
Figure 4B:
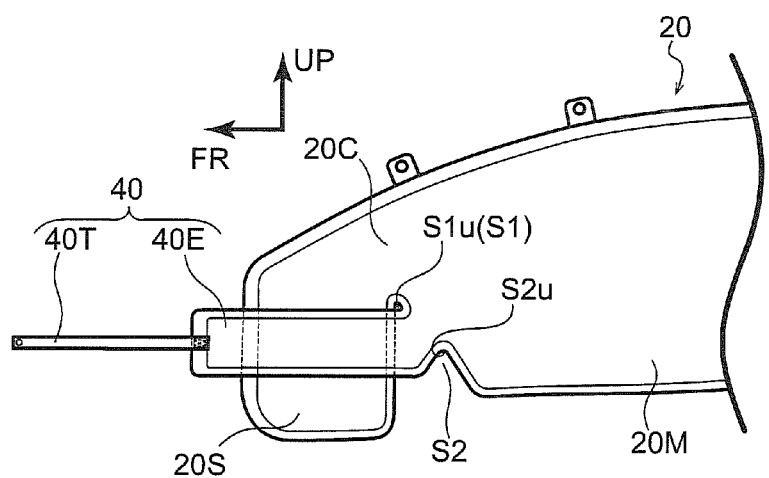
FIG. 4B is a side view showing the converted example of the curtain airbag that structures the occupant protecting device relating to the embodiment of the present invention, and showing a state in which an expanding portion overlaps an auxiliary deploying portion.

Note that the above-described embodiment illustrates an example in which the deploying portion 30E of the connecting portion 30 is structured by a base cloth that is separate from the base cloth that structures the main deploying portion 20M and the auxiliary deploying portion 20S. However, the present invention is not limited to this. For example, there may be the structure relating to the converted example that is shown in FIGS. 4A and 4B. The curtain airbag 20 shown in FIGS. 4A and 4B is provided with a connecting portion 40 instead of the connecting portion 30.

The deployed shape of the front portion of the curtain airbag 20 relating to the converted example, in a state of not being restrained to the vehicle body and not being expanded (before being folded-up), is shown in a side view in FIG. 4A. As shown in this drawing, the connecting portion 40 is structured with an expanding portion 40E and a tether 40T being the main portions thereof.

The expanding portion 40E is formed integrally with the front end side of the main deploying portion, of the base cloth that is common to the main deploying portion 20M and the auxiliary deploying portion 20S, so as to not overlap the auxiliary deploying portion 20S, i.e., is formed between the main deploying portion 20M and the auxiliary deploying portion 20S. Concretely, in the present converted example, a slit S1 separates the auxiliary deploying portion 20S and the expanding portion 40E, and an upper end S1*u* of the slit S1 is the boundary between the main deploying portion 20M and the auxiliary deploying portion 20S and the expanding portion 40E. Further, a slit S2, that separates the main deploying portion 20M and the expanding portion 40E, is formed at the rear of the slit S1. The slit S2 is inclined such that an upper end S2*u* is positioned further forward than the lower side open end. This upper end S2*u* is positioned lower than and rearward of the upper end S1*u* of the slit S1. In this converted example, the lower side portion, with respect to an imaginary line L1 that connects the upper end S1*u* of the slit S1 and the upper end S2*u* of the slit S2, is the expanding portion 40E.

As shown in FIG. 4B, this expanding portion 40E is overlapped with the auxiliary deploying portion 20S in a posture of running along the front-rear direction, due to the edge portions of the slit S1 that were facing each other being made to intersect each other and due to the slit S2 being widened. From the posture shown in this FIG. 4B, the curtain airbag 20 is folded in the form of a roll or in the form of bellows, and is accommodated in the roof side portion 28. Further, due to the front end of the tether 40T being connected to the connection portion 26A of the front pillar 26, the expanding portion 40E is, in the state in which the curtain airbag 20 is expanded and deployed, maintained in a state of overlapping the auxiliary deploying portion 20S at the vehicle width direction outer side.

Also in accordance with the structure relating to the above-described converted example, with respect to the protecting of the occupant, similar effects can be obtained by operation that is similar to that of the above-described embodiment. Further, at the curtain airbag 20 that has the connecting portion 40 relating to the present converted example, the main deploying portion 20M, the auxiliary deploying portion 20S and the expanding portion 40E can be structured by a common base cloth, and the mass-produceability is good.

Further, the above-described embodiment illustrates an example in which the curtain airbag device 14, together with the driver seat airbag device 12, structures the occupant protecting device 10, but the present invention is not limited to this. For example, the occupant protecting device may be structured by the curtain airbag device 14 and a safety device of a different form than the driver's seat airbag device 12. Or, for example, the occupant protecting device may be a structure that protects the occupant from a small overlap impact or an oblique impact by the curtain airbag device 14 alone. Moreover, for example, a pair of auxiliary deploying portions, that are expanded and deployed overlappingly in the vehicle width direction, may be provided at the front end of a main deploying portion for a rear seat, and the head of a rear seat occupant contacting the center pillar may be prevented or effectively suppressed.

Further, although the above-described respective embodiments illustrate examples in which the auxiliary deploying portion 20S is expanded and deployed by the supply of gas from the main deploying portion 20M, the present invention is not limited to this. For example, there may be a structure in which gas is supplied to the auxiliary deploying portion 20S via a gas flow passage that is formed along the upper edge of the curtain airbag, or an inner tube that is provided within the curtain airbag, or the like. Further, for example, there may be a structure in which gas is supplied to the auxiliary deploying portion 20S from an inflator that is separate from the inflator 22 that supplies gas to the main deploying portion 20M. In this structure, it is also possible to expand and deploy the auxiliary deploying portion 20S only in cases of a small overlap impact or an oblique impact.

Moreover, although the above-described embodiment illustrates an example in which the driver's seat airbag device 12 and the curtain airbag device 14 are operated in cases of small overlap impacts and oblique impacts, the present invention is not limited to this. For example, there may be a structure in which the driver's seat airbag device 12 and the curtain airbag device 14 are operated in the case of either one of a small overlap impact and an oblique impact. In this structure, the occupant is protected by another safety device in a case in which the other of a small overlap impact and an oblique impact occurs.

In addition, the present invention can, of course, be embodied by being converted in various ways within a scope that does not deviate from the gist thereof.

(Appendix)

A curtain airbag device relating to a first aspect includes: a main deploying portion that, at a time when a side impact arises, and at a time when at least one of a small overlap impact or an oblique impact arises, receives a supply of gas and expands, and is deployed in a shape of a curtain along a side window glass; an auxiliary deploying portion that is provided at a front side in a vehicle front-rear direction of the main deploying portion, and that, at a time when at least one of a small overlap impact or an oblique impact arises, receives a supply of gas and is expanded and deployed; and a connecting portion that has an expanding portion that receives a supply of gas from the main deploying portion and is expanded at an outer side in a vehicle width direction of the auxiliary deploying portion, and the connecting portion connects a front end side portion in the vehicle front-rear direction of the front pillar, and a front end side portion in the vehicle front-rear direction of the main deploying portion.

In accordance with the above-described aspect, the occupant is protected from a side impact mainly by the main deploying portion. On the other hand, at the time of a small overlap impact or an oblique impact, there are cases in which the occupant moves also toward the vehicle width direction outer side while moving toward the vehicle front. Here, the auxiliary deploying portion is expanded and deployed at the front of the main deploying portion. Further, the expanding portion of the connecting portion is expanded at the vehicle width direction outer side of the auxiliary deploying portion. Therefore, the expanding portion that is in the expanded state is interposed between the auxiliary deploying portion and the side window glass. Due thereto, the auxiliary deploying portion is greatly protruded-out and deployed toward the vehicle width direction inner side. The occupant, who moves toward the vehicle front and toward the vehicle width direction outer side, can be directly or indirectly protected by this auxiliary deploying portion.

In this way, in the curtain airbag device of the above-described aspect, the occupant protecting ability by the auxiliary deploying portion, that is expanded and deployed at the front of the main deploying portion, can be improved. Note that the auxiliary deploying portion may receive a supply of gas from the main deploying portion, or may receive a supply of gas from a gas flow path other than the main deploying portion or from a gas supplying means.

In the above aspect, a configuration may be provided, wherein the connecting portion has a tether whose one end is connected to the front end side portion in the vehicle front-rear direction of the front pillar, and whose other end is connected to the expanding portion, and the expanding portion is formed integrally of a base cloth that is common to the main deploying portion and the auxiliary deploying portion, and is structured such that, due to the tether being connected to the front end side portion in the vehicle front-rear direction of the front pillar, an expanded position of the expanding portion is maintained at a position that is overlapped with the auxiliary deploying portion at a vehicle width direction outer side.

In accordance with the above-described aspect, the main deploying portion, the auxiliary deploying portion and the expanding portion are formed into a deployed shape in which they do not overlap one another, and thereafter, the expanding portion is overlapped with the auxiliary deploying portion. This state in which the expanding portion is overlapped with the auxiliary deploying portion is maintained even at the time of expansion and deploying of the auxiliary deploying portion and the expanding portion, due to the tether being connected to the front end side portion of the front pillar. Due thereto, when gas is supplied to the main deploying portion, the expanding portion is expanded at the vehicle width direction outer side with respect to the auxiliary deploying portion.

In the above aspect, a configuration may be provided, wherein the expanding portion is formed of a base cloth that is separate from the main deploying portion, and is connected to the main deploying portion in a state of being overlapped with the auxiliary deploying portion.

In accordance with the above-described aspect, the expanding portion is connected to the main deploying portion so as to overlap the auxiliary deploying portion. Due thereto, when gas is supplied to the main deploying portion, the expanding portion is expanded at the vehicle width direction outer side with respect to the auxiliary deploying portion.

In the above aspect, a configuration may be provided, wherein the front and rear end portions of the expanding portion are structured so as to project-out forward and rearward with respect to the auxiliary deploying portion in the expanded and deployed state.

In the above aspect, a configuration may be provided, wherein the auxiliary deploying portion is structured so as to be expanded and deployed such that the lower end of the auxiliary deploying portion projects-out further downward than the lower end of the main deploying portion and the door belt line.

An occupant protecting device relating to a second aspect comprises: an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of any one of the above-described aspects, which is structured such that the auxiliary deploying portion is expanded and deployed at a front side, in the vehicle front-rear direction, with respect to the airbag for a frontal impact as seen in side view.

In accordance with the above-described aspect, an occupant who moves also toward the vehicle width direction outer side while moving toward the vehicle front at the time of a small overlap impact or an oblique impact, is protected by at least one of the airbag for a frontal impact or the main deploying portion of the curtain airbag device. Here, the auxiliary deploying portion of the curtain airbag device is deployed at the front of the airbag for a frontal impact. Therefore, even if the occupant slips in between the airbag for a frontal impact and the main deploying portion, the occupant contacting a structure of the vehicle body (the instrument panel or a pillar or the like) is prevented or effectively suppressed by the auxiliary deploying portion.

As described above, the curtain airbag device and occupant protecting device relating to the present invention have the excellent effect of being able to improve the occupant protecting ability by an auxiliary deploying portion that is expanded and deployed in front of a main deploying portion.

What is claimed is:
1. A curtain airbag device comprising:
   a main deploying portion that, at a time when a side impact arises, and at a time when at least one of a small overlap impact or an oblique impact arises, receives a supply of gas and expands, and is deployed in a shape of a curtain along a side window glass;
   an auxiliary deploying portion that is provided at a front side in a vehicle front-rear direction of the main deploying portion, and that, at a time when at least one of a small overlap impact or an oblique impact arises, receives a supply of gas and is expanded and deployed; and
   a connecting portion that has an expanding portion that receives a supply of gas from the main deploying portion, the expanding portion is expanded at an outer side in a vehicle width direction of the auxiliary deploying portion, and the connecting portion is positioned between the side window glass and the auxiliary deploying portion, and the connecting portion connects a front end side portion, in the vehicle front-rear direction, of a front pillar, and a front end side portion, in the vehicle front-rear direction, of the main deploying portion.

2. The curtain airbag device of claim 1, wherein
   the connecting portion has a tether whose one end is connected to the front end side portion in the vehicle front-rear direction of the front pillar, and whose other end is connected to the expanding portion, and the expanding portion is formed integrally of a base cloth that is common to the main deploying portion and the auxiliary deploying portion, and is structured such that, due to the tether being connected to the front end side portion in the vehicle front-rear direction of the front pillar, an expanded position of the expanding portion is maintained at a position that is overlapped with the auxiliary deploying portion at a vehicle width direction outer side.

3. An occupant protecting device comprising:

an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 2 which is structured such that the auxiliary deploying portion is expanded and deployed at a front side in the vehicle front-rear direction with respect to the airbag for a frontal impact as seen in side view.

4. The curtain airbag device of claim 2, wherein the front and rear end portions of the expanding portion are structured so as to project-out forward and rearward with respect to the auxiliary deploying portion in the expanded and deployed state.

5. An occupant protecting device comprising:

an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 4 which is structured such that the auxiliary deploying portion is expanded and deployed at a front side in the vehicle front-rear direction with respect to the airbag for a frontal impact as seen in side view.

6. The curtain airbag device of claim 4, wherein the auxiliary deploying portion is structured so as to be expanded and deployed such that the lower end of the auxiliary deploying portion projects-out further downward than the lower end of the main deploying portion and the door belt line.

7. An occupant protecting device comprising:

an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 6 which is structured such that the auxiliary deploying portion is expanded and deployed at a front side in the vehicle front-rear direction with respect to the airbag for a frontal impact as seen in side view.

8. The curtain airbag device of claim 1, wherein the expanding portion is formed of a base cloth that is separate from the main deploying portion, and is connected to the main deploying portion in a state of being overlapped with the auxiliary deploying portion.

9. An occupant protecting device comprising:

an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 3 which is structured such that the auxiliary deploying portion is expanded and deployed at a front side in the vehicle front-rear direction with respect to the airbag for a frontal impact as seen in side view.

10. The curtain airbag device of claim 8, wherein a front end portion and a rear end portion of the expanding portion are structured so as to project-out forward and rearward with respect to the auxiliary deploying portion in the expanded and deployed state.

11. An occupant protecting device comprising:

an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 5 which is structured such that the auxiliary deploying portion is expanded and deployed at a front side in the vehicle front-rear direction with respect to the airbag for a frontal impact as seen in side view.

12. The curtain airbag device of claim 10, wherein the auxiliary deploying portion is structured so as to be expanded and deployed such that the lower end of the auxiliary deploying portion projects-out further downward than the lower end of the main deploying portion and the door belt line.

13. An occupant protecting device comprising:

an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 7 which is structured such that the auxiliary deploying portion is expanded and deployed at a front side in the vehicle front-rear direction with respect to the airbag for a frontal impact as seen in side view.

14. An occupant protecting device comprising:

an airbag device for a front seat that, at a time when a frontal impact arises, and at a time when, among a small overlap impact and an oblique impact, an impact of a form in which the main deploying portion is deployed arises, causes an airbag for a frontal impact to expand and deploy by a supply of gas; and the curtain airbag device of claim 1 which is structured such that the auxiliary deploying portion is expanded and deployed at a front side in the vehicle front-rear direction with respect to the airbag for a frontal impact as seen in side view.

15. The curtain airbag device of claim 1, wherein an upper rear end portion of the auxiliary portion is a communication portion that communicates the auxiliary deploying portion with the main deploying portion such that the auxiliary deploying portion receives the supply of gas from the main deploying portion through the communication portion, and wherein the auxiliary deploying portion and the main deploying portion define a vertical slit that extends from below the communication portion to a lower end of the curtain airbag device.

16. The curtain airbag device of claim 1, wherein the auxiliary deploying portion is expanded and deployed in a substantially cylindrical shape having an elongated axis in a vertical direction.

17. The curtain airbag device of claim 1, wherein the connecting portion connects a lower front end side portion, in the vehicle front-rear direction, of the front pillar, and a lower front end side portion, in the vehicle front-rear direction, of the main deploying portion.

18. The curtain airbag of claim 1, wherein the auxiliary deploying portion is expanded and deployed so as to cover an interior side, in the vehicle width direction, of the front pillar.

19. The curtain airbag device of claim 1, wherein the expanding portion is expanded and deployed overlappingly at the outer side in a vehicle width direction of the auxiliary deploying portion.

20. The curtain airbag device of claim 1, wherein the main deploying portion and the auxiliary deploying portion are separated by a vertical slit, and
   wherein a rear end of the connecting portion is connected at the front end portion of the main deploying portion.

\* \* \* \* \*

UNITED STATES PATENT AND TRADEMARK OFFICE
CERTIFICATE OF CORRECTION

| | |
|---|---|
| PATENT NO. | : 9,108,588 B2 |
| APPLICATION NO. | : 14/138285 |
| DATED | : August 18, 2015 |
| INVENTOR(S) | : Osamu Fukawatase et al. |

Page 1 of 1

It is certified that error appears in the above-identified patent and that said Letters Patent is hereby corrected as shown below:

On the title page item (73), Assignee, after "Toyota Jidosha Kabushiki" delete "Kiasha" and insert --Kaisha--, therefor.

Signed and Sealed this
Third Day of May, 2016

Michelle K. Lee
*Director of the United States Patent and Trademark Office*